United States Patent [19]

Tedeschi

[11] Patent Number: 5,090,468

[45] Date of Patent: Feb. 25, 1992

[54] DEVICE FOR LOCKING A ROLL-UP CURTAIN, FOR PROTECTION OF WINDOW OPENINGS AND THE LIKE, IN THE SHUT POSITION

[75] Inventor: Giovanni Tedeschi, Funo di Argelato, Italy

[73] Assignee: Sunproject S.R.L., Bologna, Italy

[21] Appl. No.: 519,853

[22] Filed: May 7, 1990

[30] Foreign Application Priority Data

May 12, 1989 [IT] Italy ............................ 4810/89[U]

[51] Int. Cl.⁵ ................................................ E06B 9/54
[52] U.S. Cl. .................................... 160/290.1; 160/271
[58] Field of Search ................. 160/290.1, 270, 271, 160/273.1, 272, 275, 276, 281, 288, 23.1

[56] References Cited

U.S. PATENT DOCUMENTS

| | | | |
|---|---|---|---|
| 1,885,756 | 11/1932 | Norquist et al. | 160/290.1 X |
| 1,914,431 | 6/1933 | Jacobs et al. | 160/276 X |
| 1,934,103 | 11/1933 | Traut | 160/290.1 X |
| 1,972,182 | 9/1934 | Chamberlain et al. | 160/276 |
| 2,126,782 | 8/1938 | Julien | 160/276 X |
| 2,543,118 | 2/1951 | Maffei et al. | 160/23.1 |
| 3,068,937 | 12/1962 | Christensen | 160/290.1 X |
| 3,158,195 | 11/1964 | Ney | 160/290.1 X |
| 4,246,952 | 1/1981 | Helldorfer | 160/271 |
| 4,757,852 | 7/1988 | Jentof et al. | 160/290.1 X |

FOREIGN PATENT DOCUMENTS 246507 9/1963 Australia ............................ 160/272

Primary Examiner—David M. Purol
Attorney, Agent, or Firm—Darby & Darby

[57] ABSTRACT

A device for locking a roll-up curtain used for protection of window openings and the like, in the fully drawn position, comprises a flap section that defines on its upper side, a seat for clamping the lower edge of the curtain. The flap section includes at opposite ends, two sliders which ride in respective vertical guides inserted in the posts of a frame enclosing the opening. Two latches are slidingly mounted in the flap section, and push-buttons have springs that drive the latches laterally into respective engagement with a lock seat provided in the base of each post. The lock seats are in post bases that are adjustable relative to the post. A fully unwound and locked curtain is released by simultaneously pressing the push-buttons.

7 Claims, 3 Drawing Sheets

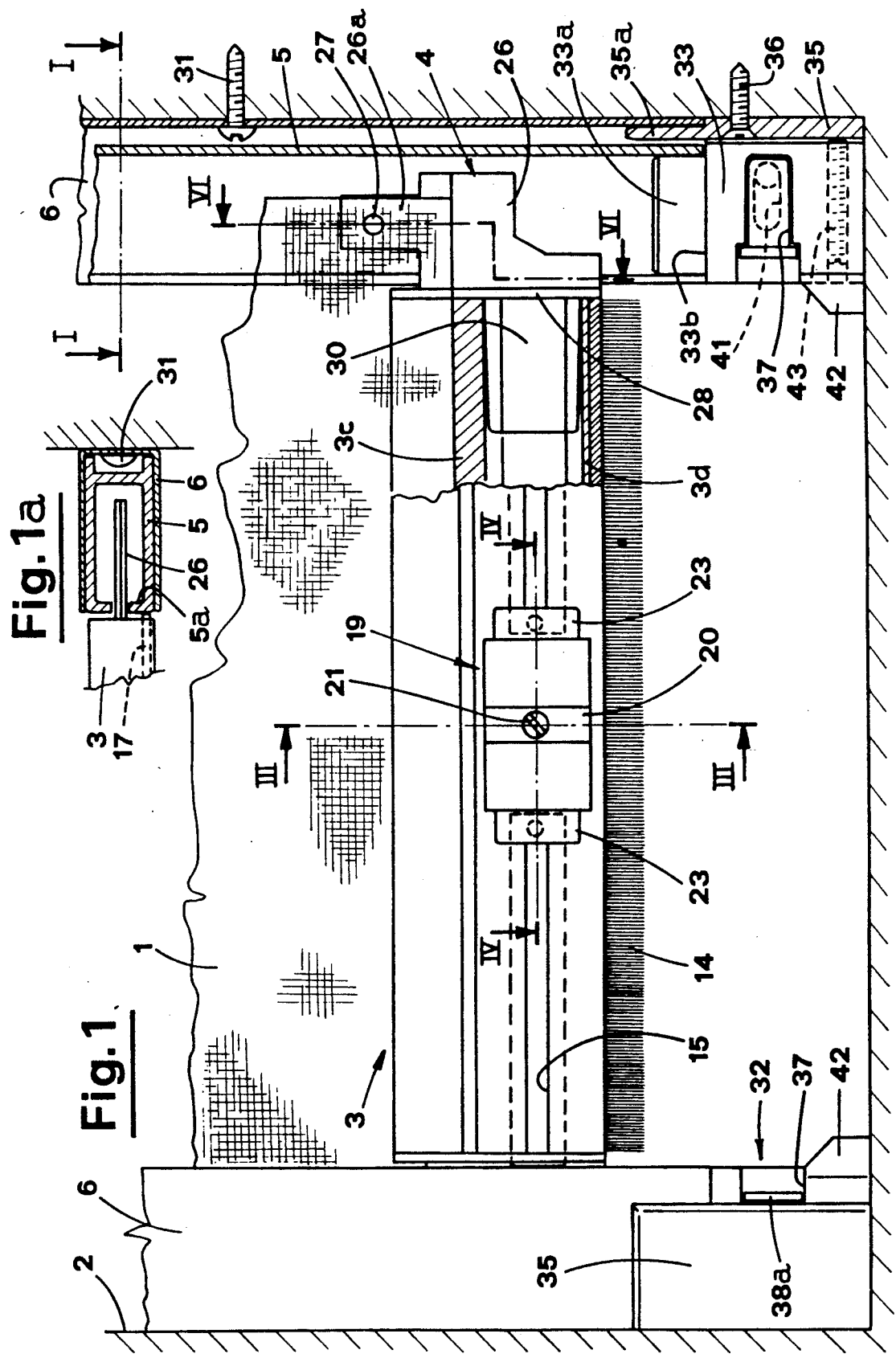

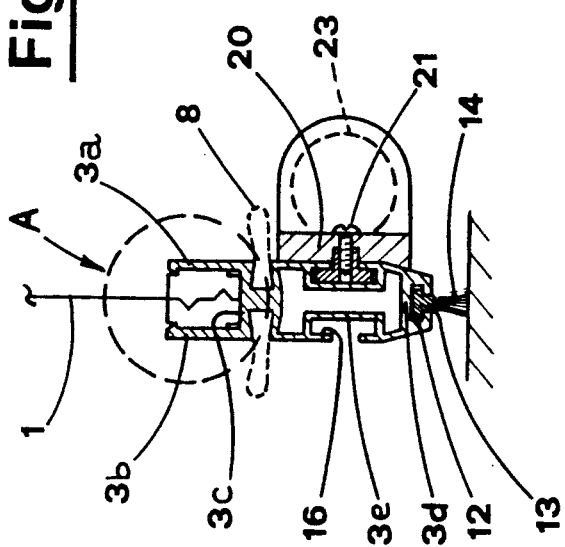
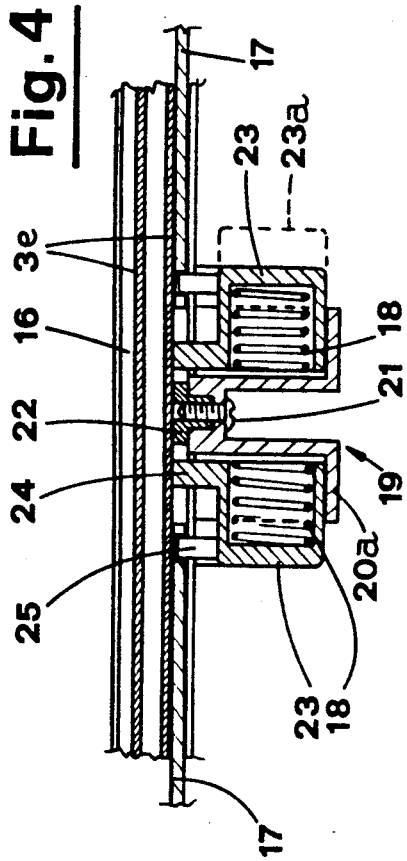
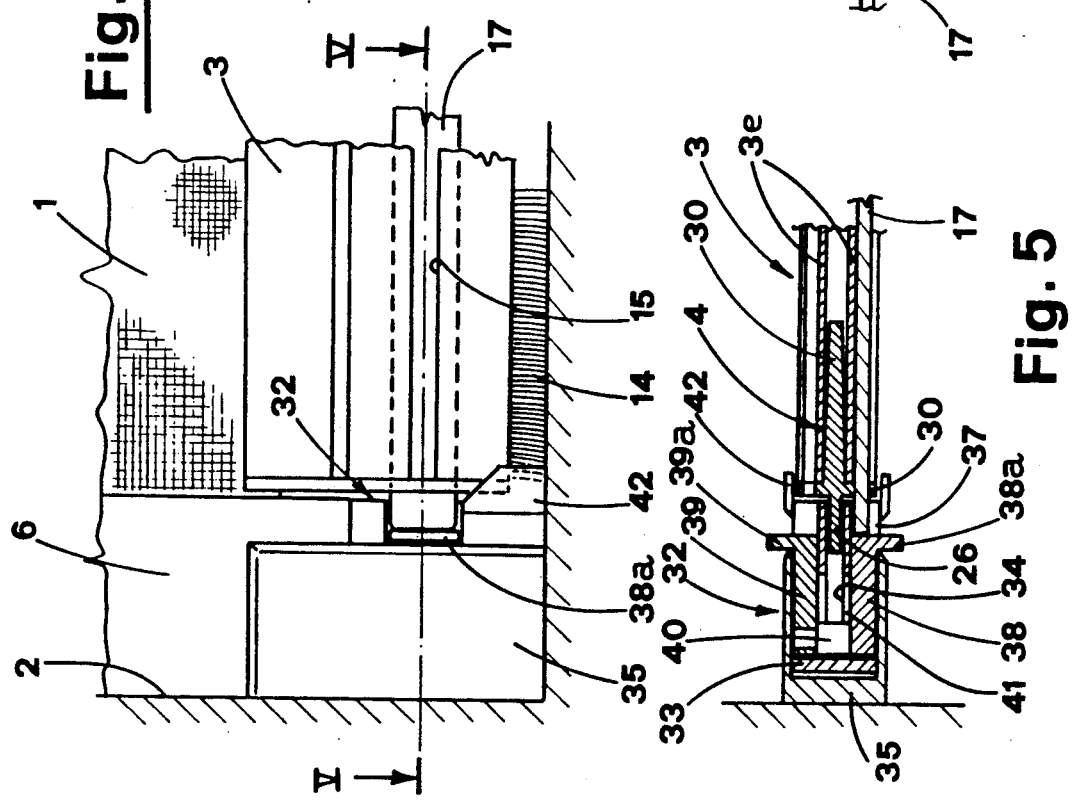

DEVICE FOR LOCKING A ROLL-UP CURTAIN, FOR PROTECTION OF WINDOW OPENINGS AND THE LIKE, IN THE SHUT POSITION

BACKGROUND OF THE INVENTION

This invention relates to a device for locking a roll-up curtain used for protection of window openings and the like, particularly for use with mosquito-nets, in the fully drawn or unwound position of the curtain, which position substantially covers the opening.

DESCRIPTION OF THE PRIOR ART

It is known that to protect rooms from mosquitoes and other insects, use is generally made of screens consisting of a close-meshed metal net fastened to a frame mounted in the window opening. More recently, it has been suggested to use a roll-up curtain with a close-meshed net suited to allow the window to be opened. The curtain is fastened at the upper edge to a take-up roller, and at the lower edge to a flap section which is slidable at its ends inside guides formed by the window frame posts.

Such a section usually includes a device for locking the roll-up curtain in the fully drawn position. The conventional locking devices generally consist of latch means driven by spring means and suited to fit, in the fully drawn position, into a seat made beside the guides and integral with their lower end.

The latches are sliding and supported by the flap section and are suited to stop, in the fully drawn position, against strikers provided on the section itself.

Such a solution may sometimes cause the disengagement of latches from the respective seats, owing to possible oscillations of the section or to any indentation of said guides in the associated guide-bearing sections.

Furthermore, the known devices require an extreme accuracy in positioning the guides, owing to the fact that the latches are stopping against the section, and the respective stop seats are integral with the guides themselves.

As a matter of fact, an improper mounting of guides may make it impossible for the stop seats to be engaged by latches.

In the known devices, when it is additionally required to move the latches from outside the room to be protected, it is necessary to provide further latches, with associated guides and lock seats, which can be operated from the outside, said latter latches being connected with the other latches, which can be operated from inside. Obviously, the constructional complexity resulting from the doubling of latches, and of their associated guides and lock seats, besides having an impact on costs, also further enhances the drawbacks mentioned above.

Moreover, the fact that the device can be operated only from the mounting side of the latches and associated lock seats, i.e., from the inside of the room to be protected, is a serious drawback too.

Besides that, the known devices leave openings, at the ends of the section, not sufficiently protected and often present a roll-up curtain not perfectly stretched and of difficult operation.

SUMMARY OF THE INVENTION

The object of the invention is to find solutions for the drawbacks mentioned above, with a device ensuring perfect locking of a roll-up curtain, for protection of window openings and the like, in the fully drawn position.

A further object of this invention is to present a locking device that is characterized by simplicity, ease of mounting, true functionality and reliability, as well as versatility.

The aforementioned objects are achieved by this device for locking a roll-up curtain in the fully drawn position, for protection of window openings and the like; said device includes a flap section defining, in the upper side, a lock seat for the lower edge of the curtain, and having at the opposite ends, two sliders which are driven in respective vertical guides inserted in the posts of a frame enclosing said opening. Two latch means which are symmetrically driven and sliding longitudinally as to said section, are suited to protrude from the ends of the same section so to engage, in said fully drawn position, respective lock seats made in associated bases of said posts. Push-button means are provided with elastic means suited to drive said latch means elastically outwards, and suited to be operate for releasing the device.

BRIEF DESCRIPTION OF THE DRAWINGS

The features of this invention will be evident from the description of a preferred form of the device for locking a roll-up curtain, for protection of window openings and the like, in the fully drawn position, shown in the drawings enclosed herewith, where:

FIG. 1 shows a front view, partial and sectional, of the device according to this invention.

FIG. 1a sectional view according to the line I—I of FIG. 1.

FIG. 2 shows a detailed view of the engagement area of said latch means in said lock seat.

FIG. 3 shows a sectional view of the section according to the line III—III of FIG. 1.

FIG. 4 shows a sectional view of the section according to the line IV—IV of FIG. 1.

FIG. 5 shows a sectional view of the locking area according to the line V—V of FIG. 2.

DESCRIPTION OF THE PREFERRED EMBODIMENT

Figure 6:
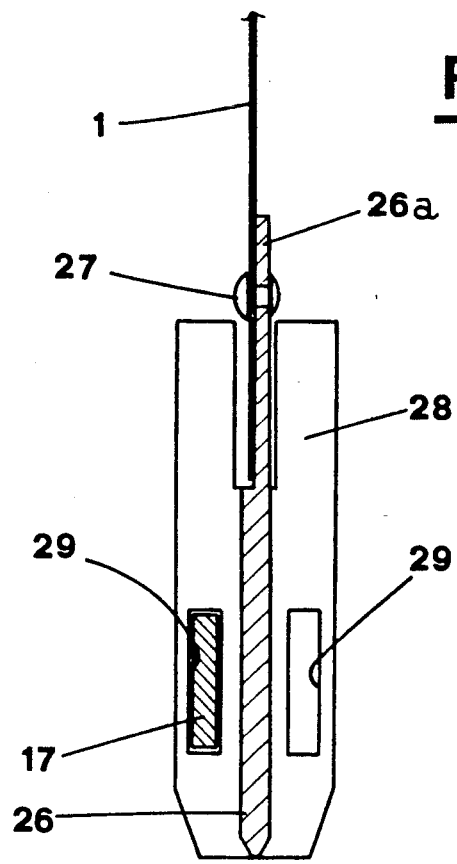
FIG. 6 shows a sectional view of a slider of the section according to the line VI—VI of FIG. 1.

With particular reference to said figures, a roll-up curtain 1, as illustrated, if for protection of the opening 2 of a window or the like, e.g., to avoid the passage of mosquitoes.

The curtain is mounted so as to be rolled up to the upper side (top of FIG. 1) on a roller device of known type, which accordingly is not shown in the drawings.

A flap section 3 is fastened to the lower edge of the curtain 1, and bears the locking device which is the subject of this invention. The section 3 slides at its ends, by means of special heads 4, in two vertical guides 5 inserted in the posts 6 of a metal frame enclosing the window opening 2. The section 3 includes, as may be seen from FIG. 3, two walls 3a,3b, vertically facing one another, and made integral with each other by an upper septum 3c and by a lower septum 3d; septa 3c,3d extend horizontally for the whole length of the section 3.

Figure 7:
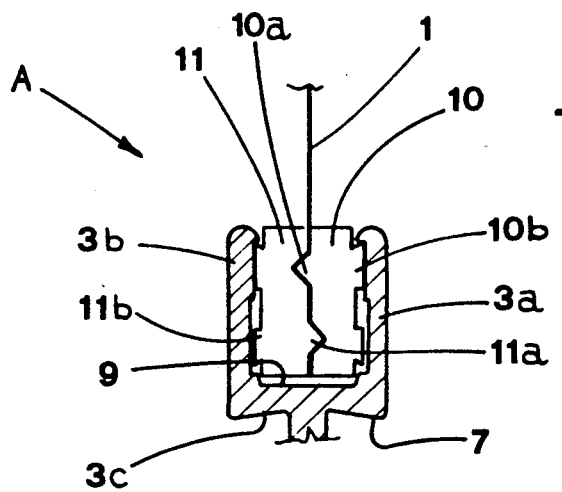
FIG. 7 shows an enlarged view of the detail A in FIG. 3.

The upper septum 3c has an increased thickness and forms opposed dovetail seats 7 for the insertion of respective handgrips 8, that are suited to make the curtain movement easier and protrude from the opposed faces of the section 3. The upper septum 3c defines the bottom of the seat 9 for mounting two complementary strips 10,11, designed for clamping the lower edge of the curtain 1, as shown in the enlarged detail A in FIG. 7.

The strips 10,11, each have longitudinally a respective tooth 10a,11a, with triangular contour, suited to couple with a corresponding slot of the other one. On the opposite faces from the teeth 10a,11a, the strips 10,11, respectively include two saw-tooth ribs 10b,11b, suited to fit into corresponding recesses of the seat 9 so as to avoid extraction of the strips themselves. The strips are inserted into the seat 9 by the elastic outward deformation of the walls 3a,3b.

Under the lower septum 3d, on the contrary, the coupling seat 12 of the body 13 of a small brush 14 is positioned. The brush 14 extends longitudinally for the whole length of the section and is suited to provide closure on the base of the opening 2.

The facing walls 3a,3b, of the section 3, bear respective longitudinal slots 15 which communicate with associated channels 16 defined, inside the section 3 itself, by two little walls 3e formed by the walls 3a,3b, in basically a central position between the septa 3c,3d.

The channels 16 define the sliding seat for two respective latches 17 making up the locking means of the device.

In practice, both latches 17 are mounted lined-up in a single channel 16, on the inward side facing the room to be protected. The latches 17 are urged in opposite directions, towards the section ends, by respective helical springs 18 acting in correspondence with a handle 19, shown in detail in FIG. 4.

The handle 19 includes a body 20 which is fastened to the section 3 at the center by means of a screw 21 which is tightened with a nut 22 held in the same body 20 and inserted in the channel 16. The body 20 forms opposed cylindrical seats 20a, housing two cup-shaped push buttons 23. Springs 18 are mounted inside the push buttons 23. The springs 18 act on the bottom of the seats 20a by compression.

The push buttons 23 externally form an anchor 24 which is inserted and slides in the channel 16. The buttons 23 are made integral with a respective latch 17 by a pin 25.

The heads 4 are provided with a slider 26 of flattened shape, which is suited to be fitted inside the guide 5, as can be seen in FIGS. 1 and 1a. The slider 26 forms, in the upper side, an extension 26a with reduced thickness, where the curtain 1 is fastened by a special rivet 27.

The slider extends from a transversal plate 28 which is suited to act as a cover of the section end; the plate 28 includes two openings 29 corresponding to the channels 16 of the section, to allow the latches 17 to come through (see FIG. 6).

From the inner face of the plate 28, an extension 30 protrudes, having an H section, which extension is inserted by pressure between the little walls 3e of the section. The posts 6 are made up of a guide-bearing channel section, fastened to the wall by means of screws 31.

The guides 5 are, in their turn, made up on an H-section, provided with folded edges 5a between which a vertical opening is defined, where the sliders 26 of the heads 4 are inserted so as to slide (see FIG. 1a). In the lower ends of the posts 6, a respective base 32 is placed, to define the engaging seat of the latches 17. Such base 32 is made up of a body 33 having a basically parallelipipedal shape, with a vertical median slit 34 into which the slider 26 can fit.

The body 33 is inserted into a shoe housing 35 having a channel section, and being fastened to the wall by a screw 36.

The shoe housing 35 has a tab 35a in the upper side, associated with the lower end of the post 6. The body 33 presents, in the upper side, a narrowed portion 33a on which the guide 5 is engaged; the portion 33a defines, peripherally as to the top of the body 33, a shoulder 33b on which the same guide 5 is resting. The body 33 includes, made on the opposed faces, two oblong recesses 37 extending horizontally, in which respective levers 38,39, are mounted so that they may slide.

The lever 38 presents a transversal pin 40 by which it is made integral with a corresponding hole of the lever 39, so as to form a release leverage. The pin 40 passes through a slot 41 passing longitudinally as to the oblong recesses 37.

The levers 38,39, have respective transversal teeth 38a,39a, protruding from the edge of the shoe 35 and suited to allow the leverage to move along the recesses 37.

The levers 38,39, define, according to the mounting side of the locking device, the front striker of the latches 17 in correspondence with a lock seat defined by the associated recess 37 in the body 33 of the base 32. The recesses 37 have a slightly greater height in the inward side of the opening 2, and they are a little higher than the latches 17.

Under said lock seat, the base 32 presents, at opposed sides, two wings 42 protruding so as to act as a protection of the angle area corresponding, in practice, to the ends of the small brush 14.

Finally, the base 32 includes a horizontal hole, made in its lower side, for an adjusting screw 43 which is suited to act on the bottom of the shoe housing 35, so as to bring about a suitable inclination of the base itself. The operation of the device may be easily understood from the above description. In a partially or totally open position of the opening 2, the latches 17 strike against the edge 5a of the guides 5, as it is shown in FIGS. 1 and 1a. When the section 3 is lowered to the fully drawn position, the ends of the latches 17 snap into the respective lock seats defined by the recesses 37, as it is shown in FIGS. 2 and 5.

In fact, the latches 17 are pushed by the respective springs 18 acting on the push-buttons 23 guided in the channel 16 of the section 3 and integral with the same latches.

In the fully drawn position, the push-buttons 23 take the position indicated by dotted line 23a in FIG. 4, partially extracted form the associated seats 20a of the body 20 of the handle 19.

In said drawn position, the device assures the locking of the roll-up curtain 1. In fact, since the latches 17 are inserted with their ends in the lock seats provided in the bases 32, and strike elastically against the teeth 38a of the levers 38, the mutual engagement is assured even in the case of oscillations of the section 3. Said engagement is also assured even when there are slight clearances between the section 3 and the guides 5. Therefore, a particular accuracy in the assembly phase is not required.

In order to release the device and to lift the roll-up curtain 1, it is necessary to press the push-buttons 23, against the springs 18, so that the latches 17 are extracted from the respective lock seats. However it is also possible to carry out the release, when necessary, from the outer side of the curtain, by moving the leverage formed by the levers 38,39 along the recesses 37, so that the ends of the latches are pushed out of the lock seats. It is to be pointed out that the roll-up curtain is always perfectly stretched, owing to its lower edge being clamped between the strips 10,11, which extend for the whole length of the section 3, that is the width of the opening between the posts 6.

Furthermore, the curtain is prevented from coming out of the guides 5, at its ends, by the rivet 27 by which the same curtain is fastened to the slider 26.

It is also to be pointed out that the wings 42 of the bases 32 close the angle area at the ends of the small brush 14, so assuring the closure of the whole surface of the window opening 2. It is also to be stated that the screws 43 make it possible to adjust, when required, the inclination of the guides 5 with respect to the posts 6, in such a way as to assure their verticality even when the window opening 2 is not perfectly square. By the adjusting screws 43, the associated bases 3 are moved with respect to the shoe housing 35 fixed to the wall, moving the guides 5 which are inserted on top of the same bases. Furthermore, the screws 43 have the function to prevent the guides 5 from being indented in the posts 6.

What is claimed is:

1. A device for locking a roll-up curtain in the fully drawn position, said curtain being intended for protecting an opening having a top, bottom and two opposed vertical sides, with vertical posts at said opening sides, said posts being a portion of an opening frame and having respective vertical guides formed therein comprising:

a flap section extending horizontally between said two opposed sides, said flap section having a seat for securing the lower edge of said curtain, and a pair of sliders at each horizontal end of said flap section, respectively;

a body located at the bottom of each said post, each said body having a basically polyhedron shape and a vertical median slit dimensioned to receive a respective slider of said flap section, each body having on opposed faces an oblong recess extending horizontally, said oblong recesses being lock seats for a pair of latch means connected to said flap section and extending horizontally, said latch means being biased horizontally to protrude from the ends of said flap section and to engage respectively in said lock seats when said curtain is in said fully drawn position;

each said body having on its top a narrow portion for insertion into the bottom of the associated post.

2. A device as in claim 1, and further comprising a shoe housing having a channel section, each said body being inserted into a shoe housing, said shoe housing being fastenable to a wall by screw means.

3. A device as in claim 1, wherein said oblong recesses include respective levers in a sliding assembly, said levers being connected by a transversal pin extended through a slot longitudinal with respect to said oblong recesses, said levers being a front striker of said latch bars, respectively, and including teeth protruding transversely, said levers being mounted to move along said recesses.

4. A device as in claim 1, and further comprising two complementary strips for clamping a lower edge of said curtain in said flap section seat, each of said strips having a respective tooth on a longitudinal face, said tooth being dimensioned for mating engagement with a counter-shaped slot in the opposed strip, said strips being engaged with said seat by the outward elastic deformation of longitudinal walls defining said seat.

5. A device as in claim 1, and further comprising a handle including a body fastened to said flap section in a central position, said handle having opposed cylindrical seats for housing push-button means for driving said latch means horizontally inward toward the center of said flap section for releasing said latch means, said push-button means including push-buttons and spring means acting by compression on said seats, and being mounted inside said push-buttons, said handle forming externally an anchor that slides in said flap section and including pins by which said buttons are each made integral with a respective one of said latch means.

6. A device as in claim 1, wherein each of said posts includes a guide-bearing channel section, and further comprising guides housed within said channel sections, respectively, each said guide being provided with folded edges between which one said vertical guide is defined, each said slider of said flap section being slidably inserted between said folded edges.

7. A device as in claim 1, wherein said bodies each include a horizontal hole near their respective bottoms, and further comprising an adjusting screw received in each said horizontal hole, said adjusting screw when rotated acting on the bottom of a shoe housing integral with the associated post, a correct inclination of said body relative to said post being provided by said adjustment.

* * * * *